United States Patent [19]

Rose et al.

[11] Patent Number: 4,785,659

[45] Date of Patent: Nov. 22, 1988

[54] FLUID LEAK DETECTOR

[76] Inventors: H. Barry Rose, 8585 O'Hare Rd., Las Vegas, Nev. 89131; Travis D. Maxwell, 5222 Eugene, Las Vegas, Nev. 89108

[21] Appl. No.: 122,676

[22] Filed: Nov. 19, 1987

[51] Int. Cl.$^4$ ............................................. G01M 3/24
[52] U.S. Cl. ................................................. 73/40.5 A
[58] Field of Search ............................ 73/40.5 A, 592

[56] References Cited

U.S. PATENT DOCUMENTS

| | | | |
|---|---|---|---|
| 3,192,516 | 6/1965 | Simpkins et al. | 73/40.5 A X |
| 3,289,465 | 12/1966 | Parker | 73/40.5 A |
| 3,500,676 | 3/1970 | Palmer | 73/40.5 A |
| 4,309,576 | 1/1982 | Corrigan | 73/40.5 A X |
| 4,416,145 | 11/1983 | Goodman et al. | 73/40.5 A |
| 4,583,406 | 4/1986 | Dimeff | 73/40.5 A X |

Primary Examiner—John Chapman
Assistant Examiner—Joseph W. Roskos
Attorney, Agent, or Firm—Jack C. Munro

[57] ABSTRACT

An apparatus for locating fluid leaks within a fluid channel such as a gas leak within a pipe line. This apparatus detects the leak by detection of sound waves created by the leaking fluid. The apparatus utilizes a sound transducer which picks up the noise of the leak. Only the ultrasonic portion of the noise is desired with the audible range to be eliminated. Eliminating of the audible range is by subtracting a reference signal from the noise produced signal. The resulting output signal is amplified and supplied to an annunciator. The annunciator can take the form of either or both an audio annunciator or a visual annunciator.

3 Claims, 1 Drawing Sheet

FLUID LEAK DETECTOR

BACKGROUND OF THE INVENTION

The field of this invention relates to ultrasonic leak detectors for locating leaks of fluid within pressurized conduits and containers. Particularly, the subject matter of the present invention is directed to an apparatus for locating the source of ultrasonic vibrations generated by escaping air or gas through small openings and wherein the apparatus is primarily composed of a transducer and means for translating the ultrasonic frequency into an audible frequency.

Gas pressurized containers and conduits are in exceedingly common use within the present day society. It is naturally desirable, and actually required, that these conduits and containers not incur any leaks.

Previously, there have been numerous different types of devices to ascertain if any type of leak has occurred. The escaping gas from a leak generates sound waves. This sound can be detected by sonic detection equipment. This leak can be discovered and pinpointed by taking sound measurements physically along the pressurized container with a transducer or the like. In this manner, the location of a leak can be ascertained.

Some leaks are quite small. All leaks produce noise, some within the audible frequency range, that is from twenty to twenty thousand hertz. However, there is also extraneous noise from numerous sources within this audible range. Therefore, the utilizing of a transducer to discover a tiny leak is practically impossible since the noise that the leak generates is mixed with the extraneous noise. It is difficult for a human being to separate the noise of the leak from the extraneous noise even with exceedingly sensitive equipment.

However, it has been found that all leaks generate not only noise within the audible range but also ultrasonic noise. There is a substantial less amount of extraneous noise within the ultrasonic range. Therefore, if a leak detector could be constructed to be sensitive only to ultrasonic noise, substantially increased sensitivity to a leak would be possible.

SUMMARY OF THE INVENTION

The structure of the present invention relates to a sonic leak detector which utilizes a transducer to pickup the noise produced by a leak. This noise is transmitted to an amplifier into which is supplied an adjustable reference signal. This reference signal will not exceed the audible range and will generally be adjusted to be located at the upper end (twenty thousand hertz) of the audible range. Subtracting this signal from the overall signal received from the leak results in the elimination of the noise created within the audible range from the leak leaving only the ultrasonic noise which now transformed into the audible range. This now produced output is supplied through a filter to eliminate as much as possible the extraneous noise and then is supplied to a high gain amplifier. This signal is then amplified and supplied to one or more annunciators. Generally, a desirable form of annunciator would be an audio annunciator and a visual annunciator. By the using of two different types of annunciators, the chance of discovering a leak is definitely increased. A common form of audio annunciator would be headphones. A common form of a visual annunciator would be a light with a series of lights being preferred so that as the sound intensity increases the greater the number of lights that are activated.

The primary objective of the present invention is to construct a leak detector to detect fluid leaks within pressurized vessels so that the leak can be identified, located and repaired.

Another objective of the present invention is to construct a leak detector which is less susceptible to extraneous noise and is designed to be exceedingly sensitive so that any leak, no matter how small, can be detected.

Another objective of the present invention is to construct a leak detector which is constructed of a minimum amount of components and therefore can be manufactured at an inexpensive price and, therefore, sold to the consumer at an inexpensive price.

DETAILED DESCRIPTION OF THE SHOWN EMBODIMENT

Figure 1:
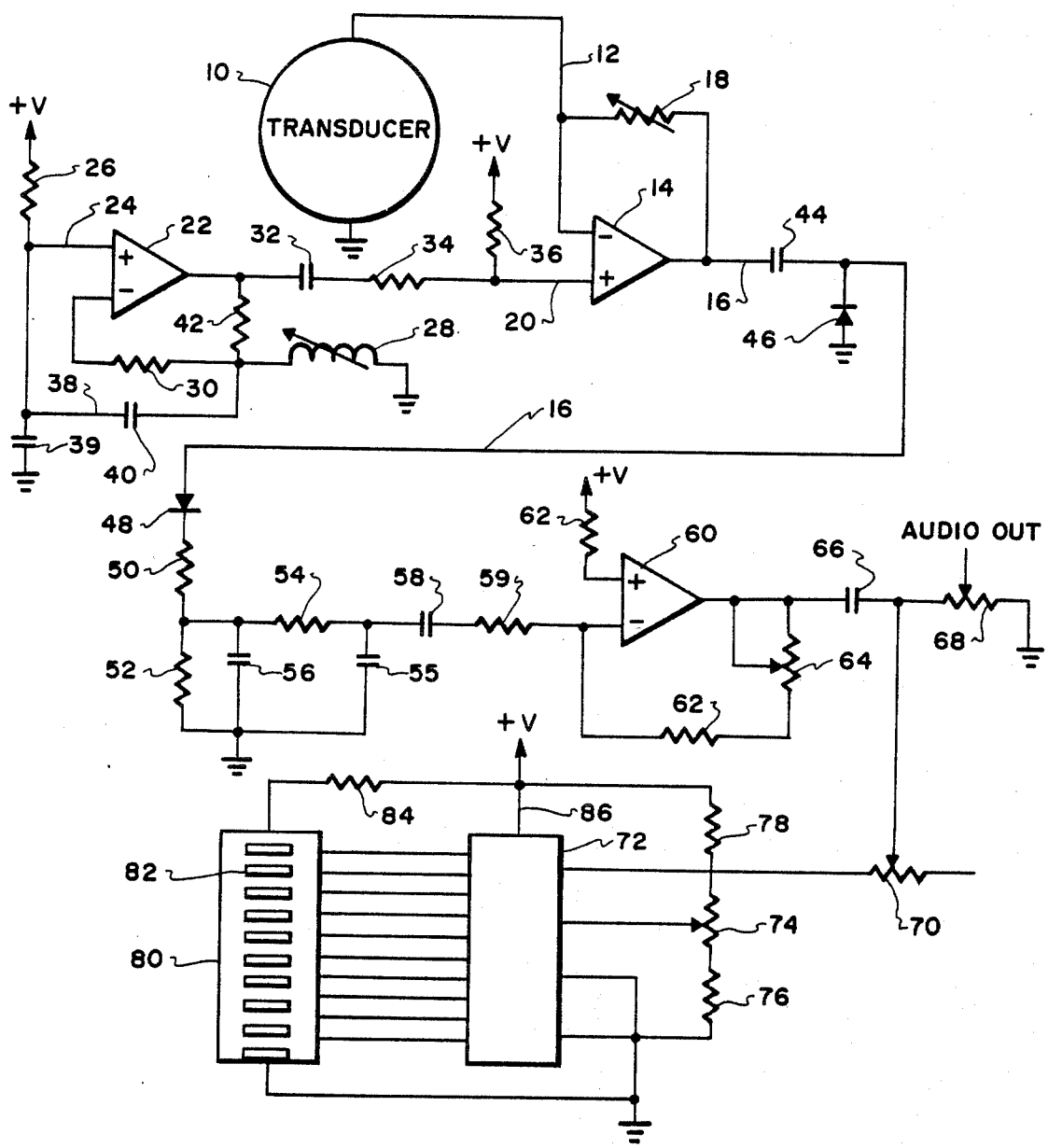
FIG. 1 shows the circuit diagram for the leak detector of the present invention.

Referring particularly to the drawing, there is shown a transducer 10 which is to be moved along a pipe or pressurized container which contains a pressurized fluid. When the transducer becomes located directly adjacent to a leak, the noise created by that leak will be picked up by the transducer 10. This noise is transmitted in the form of a signal through conductor 12 to an amplifier 14. The signal being transmitted through conductor 12 to amplifier 14 is within the audible range, say twenty to twenty thousand hertz, and also within the ultrasonic range such as twenty to forty thousand hertz. Amplifier 14 produces an output signal within conductor 16. Connected between conductors 12 and 16 is a resistor 18.

Figure 2:
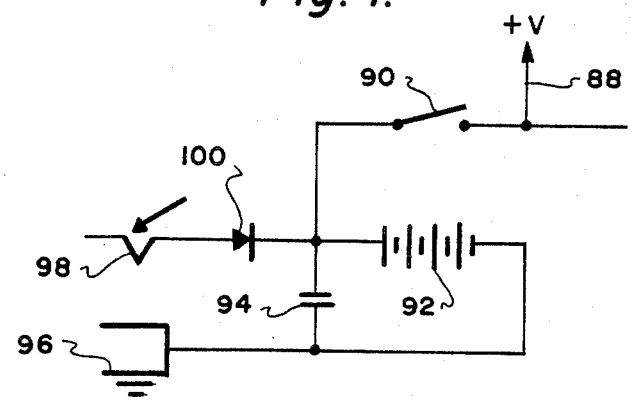
FIG. 2 is an electrical diagram for the power supply circuit utilized in conjunction with the leak detector circuit of FIG. 1.

Also supplied to the amplifier 14 through conductor 20 is a reference signal. This reference signal is produced from amplifier 22. A positive input signal is to be supplied from conductor 24 to the amplifier 22. Positive voltage from the power source shown in FIG. 2 is to be supplied through resistor 26 to conductor 24. To the negative side of the amplifier 22 there is connected an adjustable coil 28. The coil 28 connects through resistor 30 which biases amplifier 22. It is to be noted that the resistor 18 is to be adjustable to set the gain of the amplifier 14. The reference signal produced by amplifier 22 is supplied through capacitor 32 and a resistor 34 to the amplifier 14. Additional input power is supplied through resistor 36 to the conductor 20.

Connected across conductors 24 and 20 is a conductor 38. Conductor 38 includes capacitors 39 and 40 and resistor 42. Al the previously mentioned components denoted from numeral 20 to numeral 42 define an oscillator. By selecting of the sizes of the components within the oscillator circuit, the frequency of this oscillating circuit is established. Conductor 38 also junctions the conductor connecting coil 28 and resistor 30.

The reference signal will be within the audible level (twenty to twenty thousand hertz). Let it be assumed that the signal from the transducer 10 has an audio component up to thirty-five thousand hertz. The amplifier 14 eliminates all picked up noise to twenty thousand hertz. The ultrasonic component of between twenty to thirty-five thousand hertz is now transferred into the audible range between zero and fifteen thousand hertz. This part of the picked up sound is normally not hearable by a human being.

The alternating current output signal from amplifier 14 within conductor 16 is coupled by way of capacitor 44. The negative component of the signal within conductor 16 is stripped by diode 46. This signal within conductor 16 is further rectified by diode 48. This signal is then conducted into a bandpass filter composed of resistors 50, 52 and 54, and capacitors 55, 56 and 58. Capacitor 56 and the conductor carrying resistor 52 and capacitor 55 are connected to ground. This bandpass filter functions to remove extraneous noise prior to being transmitted through current limiting resistor 59 to the high gain amplifier 60. Input power is supplied to amplifier 60 through resistor 62 to the positive side of amplifier 60. The signal from conductor 16 is supplied to the negative side of amplifier 60. Amplifier 60 is biased by resistors 62 and 64. The gain of amplifier 60 can be adjusted by varying of resistor 64.

The output of the amplifier 60 is conducted through capacitor 66 to headphones represented by variable resistor 68. Also, the output signal from amplifier 60 is conducted through variable resistor 64. The variable resistor 68 is to set the volume level to the headphones and in the same manner the variable resistor 70 would be used to set the input level into a dot/bar graph driver 72. The driver's 72 threshold is set by the voltage divider network that consists of resistors 74, 76 and 78. It is to be understood that this resistance can be varied since resistance 74 is a variable resistor. The output from the driver 72 is input through resistor 84 into a bargraph display 80. The bargraph 80 includes a plurality of lights in the form of light emitting diodes 82. The more intense the sound of the leak picked up by the transducer 10, the greater the number of lights 82 that would be lit. Assuming there is no leak, normal extraneous noise would probably cause one of the lights 82 to be activated. If a leak is encountered, depending upon the strength of the leak, an additional light or lights 82 will then be activated.

It is to be noted that all leaks have an acoustic output. Even if the leak does not have acoustic output within the audible range, it would certainly produce sound within the ultrasonic range. It has been found also that any leak that produces a sound within the audible range will also have an ultrasonic component. Therefore, any and all leaks will be detected by the transducer 10.

The purpose of the leak detector of the present invention is to detect, convert and amplify the ultrasonic sound of the leak to a frequency that is in the range of human hearing and loud enough to be detected by the humar ear. Also, the device of this invention is to reproduce this sound intensity on a bargraph display so that peak levels of sound intensity, that may function so rapidly so as not to be discernible by the human ear, are displayed in a manner that is easy to interpret. The structure of this invention will make pinpointing a leak easier because ultrasonics are highly dirctional. Additionally, the apparatus of this invention will be easier to use because the sounds that are presented to the humar ear will make it easy to differentiate between ambient noise and the sound actually produced by the leak.

Input electrical power is to be conducted to the driver 72 through conductor 86. As previously mentioned, this input power is also supplied to resistors 26, 36 and 62. Referring particularly to FIG. 2, this input power signal is supplied to output conductor 88. Supplying of the power to conductor 88 is accomplished by closing of switch 90. The power is to be supplied from a battery 92. On the ground side of the battery 92 is connected a capacitor 94. There is to be a common electrical ground 96 for both the battery 92 and the charging jack 98 which is to be connectable to a source (not shown) for the purpose of charging battery 92. Between the charging jack 98 and the battery 92 is located diode 100 to prevent accidental reversal of power input into charging jack 98.

What is claimed:

1. A fluid leak detector comprising:
noise pickup means producing a first signal within the range of twenty to thirty-five thousand hertz;
a first amplifier for receiving said first signal, a reference signal within the range of twenty to twenty thousand hertz is applied to said first amplifier, said first amplifier emitting an output signal within the range of twenty thousand to thirty-five thousand hertz, said output signal being altered by subtracting said reference signal from said first signal transferring the twenty thousand to thirty-five thousand hertz portion of said output signal into the audible range to fifteen thousand hertz, whereby the said ultrasonic portion of said first signal which is normally not hearable by a human being is now hearable;
a second amplifier for receiving and amplifying said output signal; and
annunciator means for receiving said output signal from said second amplifier.

2. The fluid leak detector as defined in claim wherein:
said noise pickup means comprising a transducer.

3. The fluid leak detector as defined in claim 2 wherein:
said annunciator means including visual means, said visual means being visually observable by a human being to be representative of a fluid leak which has produced said first signal, said visual means comprising a series of lights, the greater the intensity of said first signal the greater the number of said lights that are activated.

* * * * *